Figure 4:
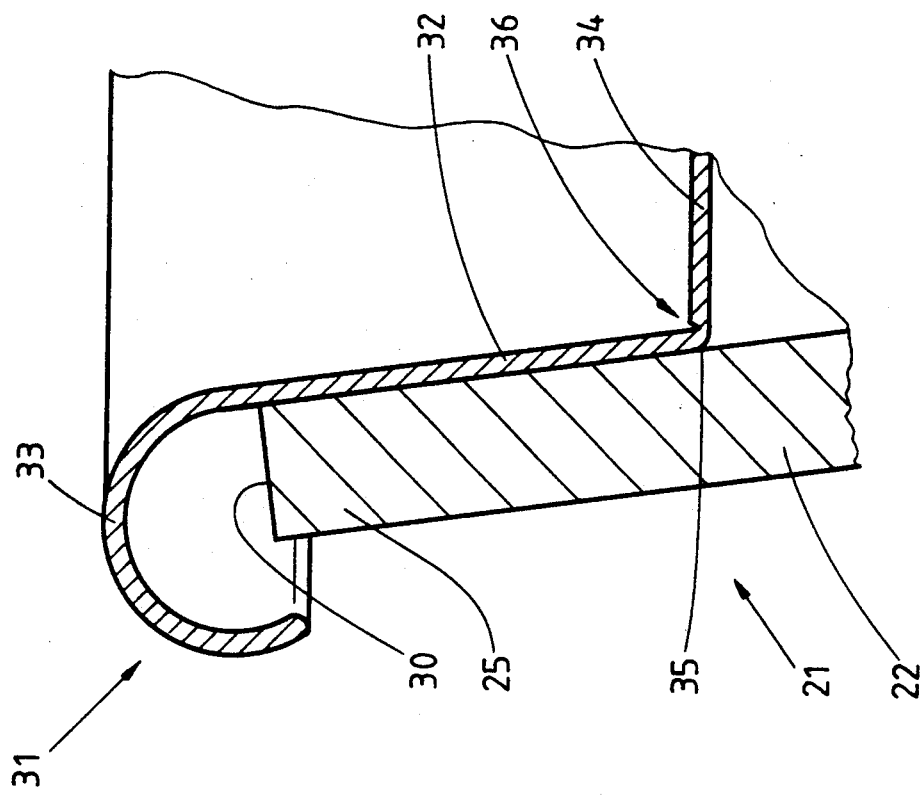

United States Patent [19]

Gröne

[11] Patent Number: 5,226,586
[45] Date of Patent: Jul. 13, 1993

[54] CONTAINER, ESPECIALLY DRINKING CUP

[75] Inventor: Horst-Ditmar Gröne, Schwanewede, Fed. Rep. of Germany

[73] Assignee: LIN TEC Verpackungstechnik GmbH, Fed. Rep. of Germany

[21] Appl. No.: 690,728

[22] Filed: Apr. 24, 1991

[30] Foreign Application Priority Data

Apr. 26, 1990 [DE] Fed. Rep. of Germany ....... 4013266
Aug. 24, 1990 [DE] Fed. Rep. of Germany ....... 4026801

[51] Int. Cl.$^5$ .................. B65D 3/30; B65D 51/00
[52] U.S. Cl. .................. 229/1.5 B; 220/640; 220/642
[58] Field of Search ........ 229/1.5 B, 5.5, 5.7, 229/123.2, 123.3; 220/356, 640, 642, 643, 712

[56] References Cited

U.S. PATENT DOCUMENTS

| | | | |
|---|---|---|---|
| 1,920,504 | 8/1933 | Hothersall | 229/5.7 |
| 2,723,072 | 11/1955 | Sayford, Jr. | 229/5.5 |
| 2,941,660 | 6/1960 | Tupper | 229/123.2 |
| 2,997,788 | 8/1961 | Gilbert | 220/356 |
| 3,142,433 | 7/1964 | Balocca | 229/5.7 |
| 3,301,459 | 1/1967 | Gardner | 229/123.2 |
| 3,410,448 | 11/1968 | Hudson | 220/356 |
| 3,421,681 | 1/1969 | Frank | 229/123.2 |
| 3,463,348 | 8/1969 | Pound et al. | 220/712 |
| 3,572,579 | 3/1971 | Mueller et al. | 229/123.2 |
| 3,722,732 | 3/1973 | Edlund | 229/5.5 |
| 3,951,331 | 4/1976 | Smith et al. | 229/123.2 |
| 4,484,964 | 11/1984 | Kawamata | 229/5.7 |
| 4,757,936 | 7/1988 | Homma et al. | 220/642 |

FOREIGN PATENT DOCUMENTS

| | | | |
|---|---|---|---|
| 717488 | 1/1932 | France | 220/356 |
| 1020347 | 2/1953 | France | . |
| 2140350 | 1/1973 | France | . |
| 2175094 | 10/1973 | France | . |
| 230758 | 3/1925 | United Kingdom | 220/642 |
| 443349 | 2/1936 | United Kingdom | 229/5.7 |

Primary Examiner—Gary E. Elkins
Attorney, Agent, or Firm—Cook, Egan, McFarron & Manzo, Ltd.

[57] ABSTRACT

1. Container, especially drinking cup, and process for producing it. 2.1. Drinking cups (20) in particular often have a cup body (21) made of plastic foam. The upper rim (25) of such drinking cups (20) makes drinking more difficult. 2.2 The drinking cup (20) according to the invention possesses a collar (26) attached onto the upper rim (25) of the cup body (21) and made of a compact plastic. This provides a mouth roll which makes drinking easier and which gives the drinking cup (20) according to the invention the properties of drinking cups formed completely from more extensive compact materials. 3. The invention relates, above all, to rotationally symmetrical drinking cups (20) which are used for the dispensing of drinks from automatic machines or as inserts for reusable drinking-cup holders.

8 Claims, 5 Drawing Sheets

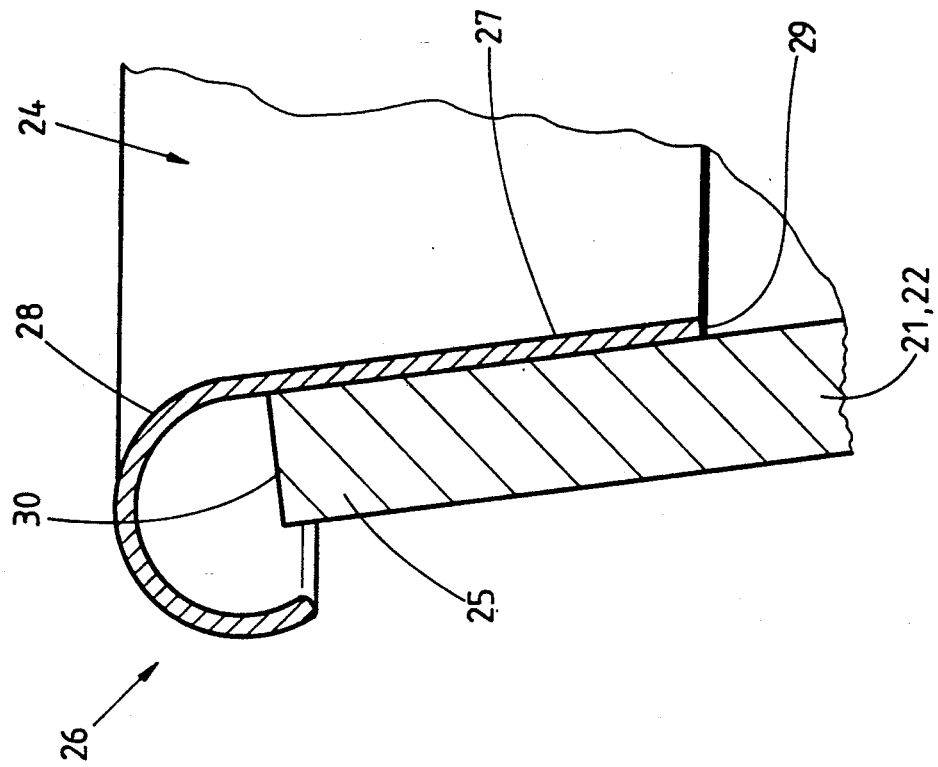
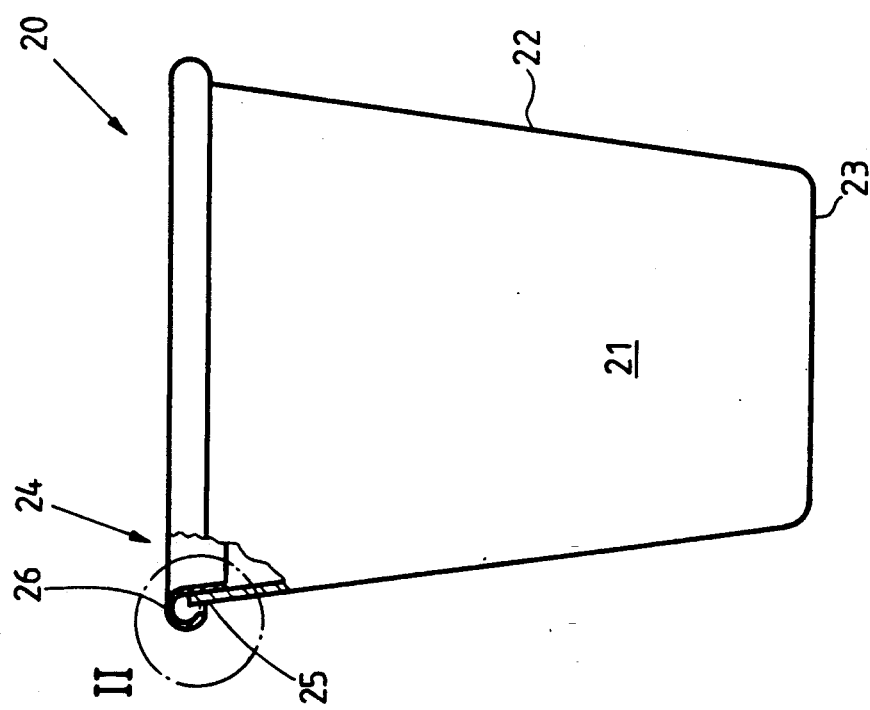

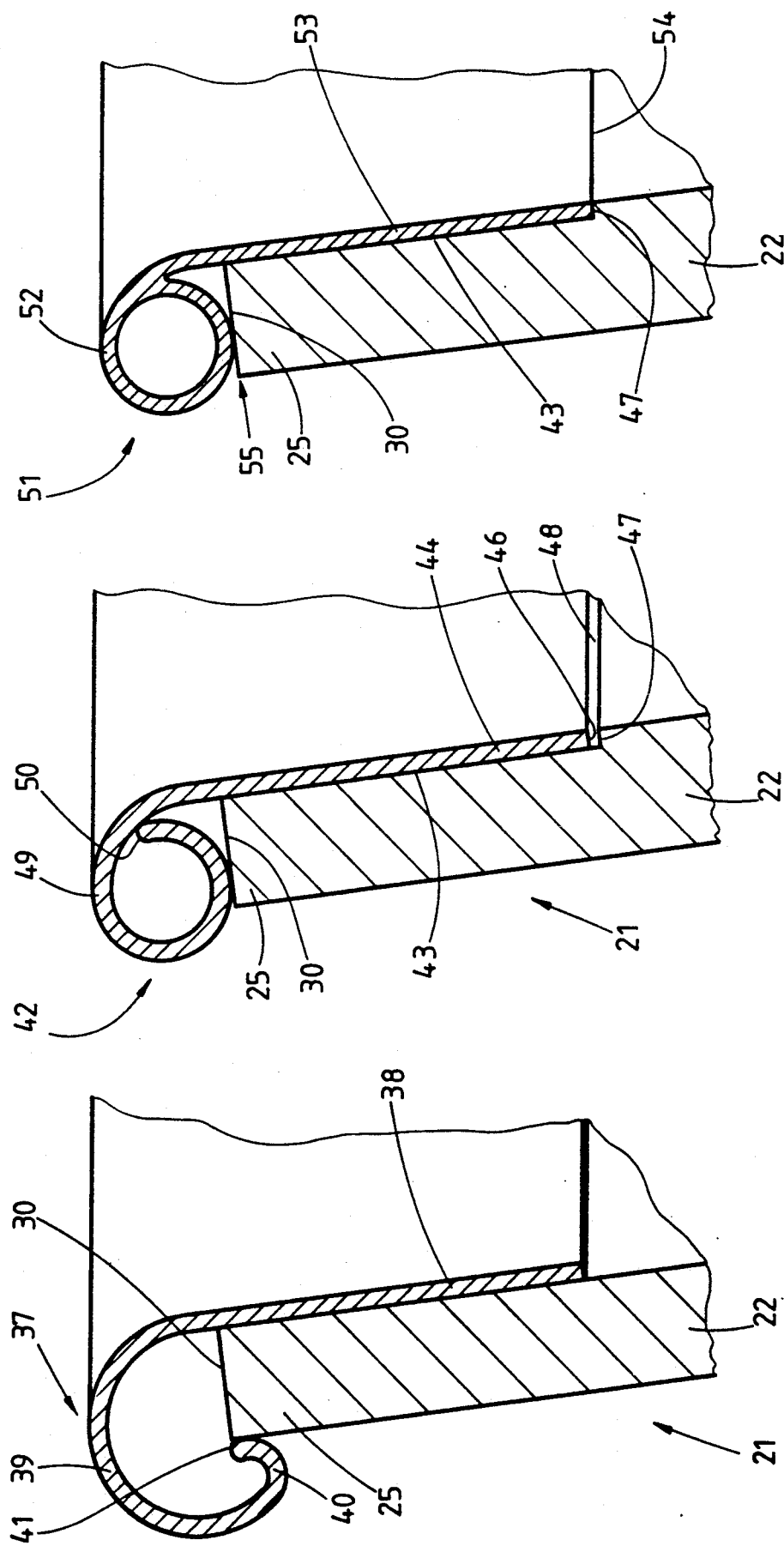

CONTAINER, ESPECIALLY DRINKING CUP

The invention relates to a container, especially a drinking cup, including a container body which preferably consists of plastic foam, cardboard or the like and which has an continuous rim for forming an orifice. The invention relates, furthermore, to the process for producing a container or drinking cup The containers under consideration here are so-called throw-away containers which, after being used (once), are destroyed. The containers consisting especially of plastic foam or cardboard (waxed and nonwaxed) meet problems in the region of the rim surrounding the orifice of the container body. This rim often lacks sufficient stability, and therefore damage to the container can originate from this. Moreover, the upper rim of containers of this type frequently present difficulties when a liquid is being poured out.

In containers, especially drinking cups, produced from plastic foam, a particularly serious problem arises, in that the foam rim makes it difficult or even impossible to drink from such a drinking cup. Furthermore, during drinking, the foam rim is felt to have an unpleasant effect, in that, for example, fragments of the edges of the foam rim can come loose during drinking and enter the drinker's mouth.

The object of the present invention is to develop further a container, especially a drinking cup, of the type mentioned in the introduction, to the effect that its use is not impaired by the container body produced from plastic foam, cardboard, paper or the like.

To achieve this object, the container or drinking cup includes a container body which preferably comprises plastic foam, cardboard or the like and which has an continuous rim for forming an orifice. A continuous collar consisting of compact plastic and located on the rim of the container body provides a container or drinking cup which can be produced cheaply from plastic foam, cardboard or the like and which, in its critical rim region, has the positive properties of containers or the like made from compacted plastic or similar materials. In drinking cups above all, the collar consisting of compacted plastic forms a mouth roll allowing agreeable drinking.

Appropriately, the collar is composed of an arc segment or circle segment to form the mouth roll and of a connecting portion formed in one piece on it. The latter serves for connecting the collar to the container body in a simple way. This connection can be made by frictional and/or positive engagement, adhesive bonding, welding or the like, and combinations of the above-mentioned methods of connection are also possible.

Preferably, the connecting portion is matched at least in places to the container body, particularly to a region of its upper rim. The connection between the container body and the collar can thereby be made easily and accurately.

The connecting portion can be matched both to near-rim regions of the inner wall and to a near-rim region of the outer wall of the container body. The run or shape of the upper region of the container body is decisive for this. Where walls of the container body extending vertically are concerned, it is also possible to assign the connecting portions both to the inner wall and to the outer wall of this.

According to a preferred development of the container, a continuous recess for receiving at least a part of the connecting portion on the collar is provided in the corresponding region of the upper rim of the container body. This gives rise, after the collar has been connected to the container body, to a virtually transition-free integration of the connecting portion into the corresponding wall of the container body.

The dimensions of the circle segment or arc segment of the collar are essentially matched to the dimensions of the container, especially to the wall thickness. To obtain a sufficiently thick mouth roll on a relatively thin-walled container body, the collar can have an arc segment projecting in the manner of a bead beyond the outer wall of the container body. In contrast, on container bodies with greater wall thicknesses, it can be sufficient to use a bead portion which extends over the region of the continuous near-rim end face of the container body, preferably overlaps this, whilst bearing on it. The bead portion can be of any form. It is appropriately of round or elliptic design.

A first process for producing a cup, especially a drinking cup with a container body which preferably comprises plastic foam, cardboard or the like and which has an continuous rim for forming an orifice, includes forming a prefabricated collar. According to this, a prefabricated collar is connected to a likewise prefabricated container body in the region of an upper rim. The container body and the collar can thus be produced independently of one another, with the result that the collar can easily be of any expedient form and the shaping operations can allow for the different materials of the collars on the one hand and of the container bodies on the other hand.

Preferably, the container or drinking cup is manufactured by forming the collar from an endlessly produced strand by wrapping it round the upper rim of the container body made in the conventional way. The strand required for the collar can be produced continuously in a very simple way and fed to the container body simply.

The wrapping of the collar formed from a strand round the upper rim of the container body is carried out simply in such a way that ends of an appropriately long strand pointing towards one another come flush in front of one another to form the collar. A relatively smooth and hardly noticeable butt seam is thus obtained at the point of connection of the ends of the strand. If appropriate, the connection ends can also be connected to one another in a suitable way, for example by welding. Alternatively, it is possible to wrap a portion of the strand round the rim of the container body with excess length, the strand overlapping itself a short distance in the region of its ends. The advantage of this procedure is that tolerances in the dimensions of the container body or during the cutting to length of the portion required from the strand are compensated in a simple way. Moreover, the ends of the collar can easily be connected to one another in the overlap region.

According to a preferred development of the process, the strand is extruded continuously and wound onto supply reels. According to an essential feature of the invention, these have a diameter which is larger than the largest diameter of the container or drinking cup. After a possibly necessary reheating of the strand to be attached to a corresponding container body and after a portion has been separated from this, the strand portion so formed can easily be brought to the shape necessary for attachment to the rim of the container body.

Alternatively, it is possible to injection-mould an appropriate strand portion as a prefabricated part. The strand portion can have a straight or slightly curved shape and in the still warm state or after reheating can be attached to the upper rim of the corresponding container body and connected to this. It is also possible, however, to produce the collar as a closed continuous shaped article in the form of the rim of the container body, specifically by injection moulding or deep drawing. This provides a finished collar of the intended shape which can be attached to the upper rim of the particular container body without any reheating and/or shaping.

The deep drawing and injection moulding of the collar are especially advantageous when the area included by it is closed, that is to say the collar has a lid. This lid can serve at the same time for closing the filled container or drinking cup, but can also be removed before or after the collar is attached to the upper rim of the container body, in particular when the containers or drinking cups to be formed are not to have a lid.

A second process for producing a cup, especially a drinking cup with a container body which preferably consists of plastic foam, cardboard or the like and which has an upper continuous rim for forming an orifice, includes forming a collar produced from a plane arcuate blank. According to this, first an arcuate plane blank is produced as a rough for the particular collar. This can be carried out by punching out from a plane web of material. As a result of an appropriate shaping of the plane blank, especially by means of an appropriate radius on this blank, the latter can subsequently be shaped to form a ring with a preferably frustoconical shell. This ring can now be equipped with the mouth roll by means of a suitable tool. This can take place either before the ring is attached to an upper rim region of the container body or after this. This process can be carried out by especially simple means, and rotary tools known per se can be used to form the mouth roll.

Figure 3:
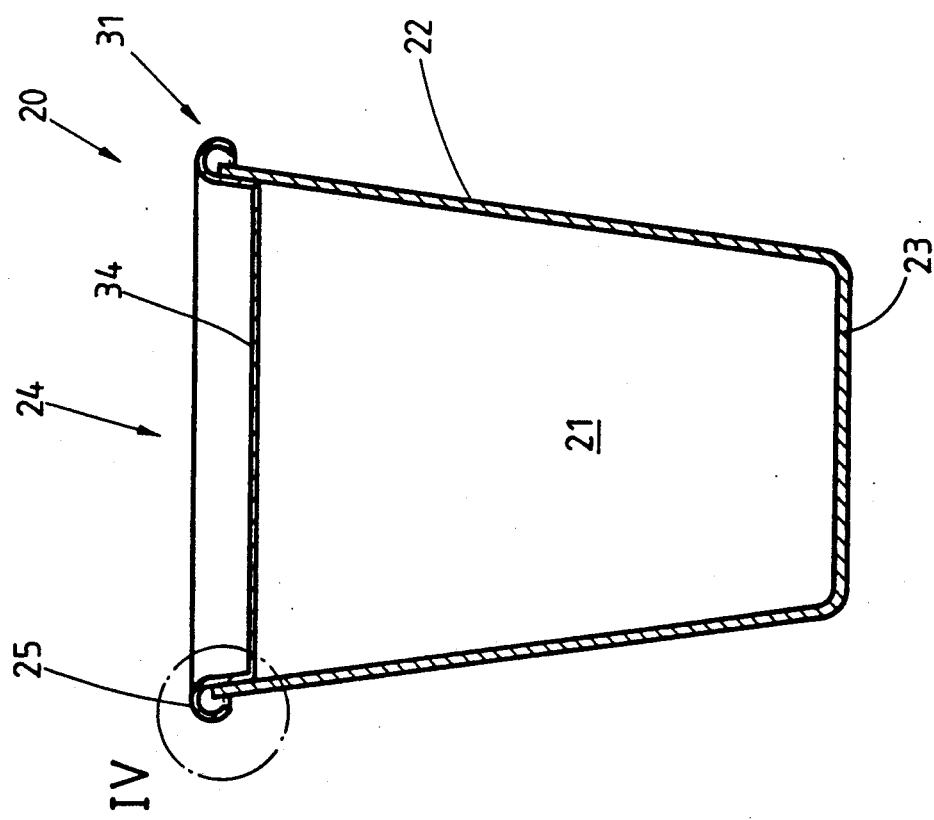
Figure 10:
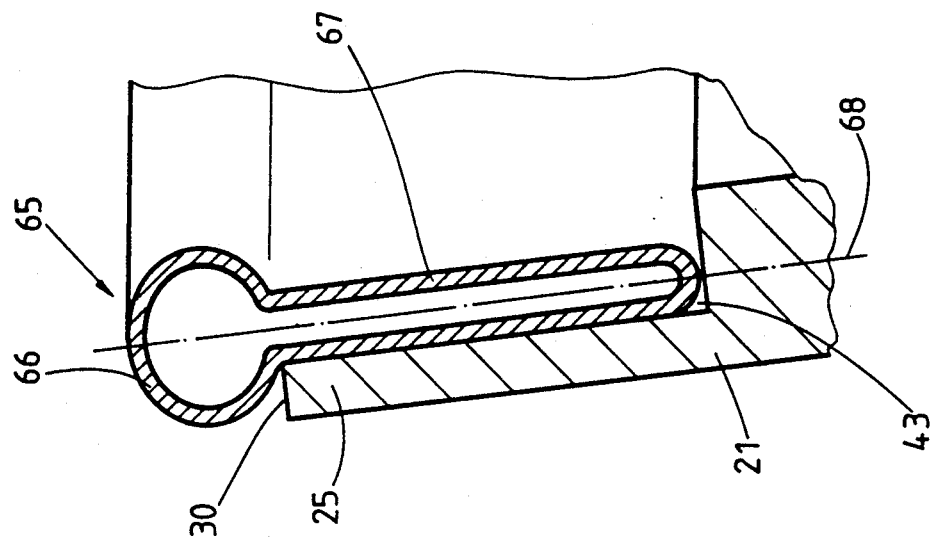
Figure 9:
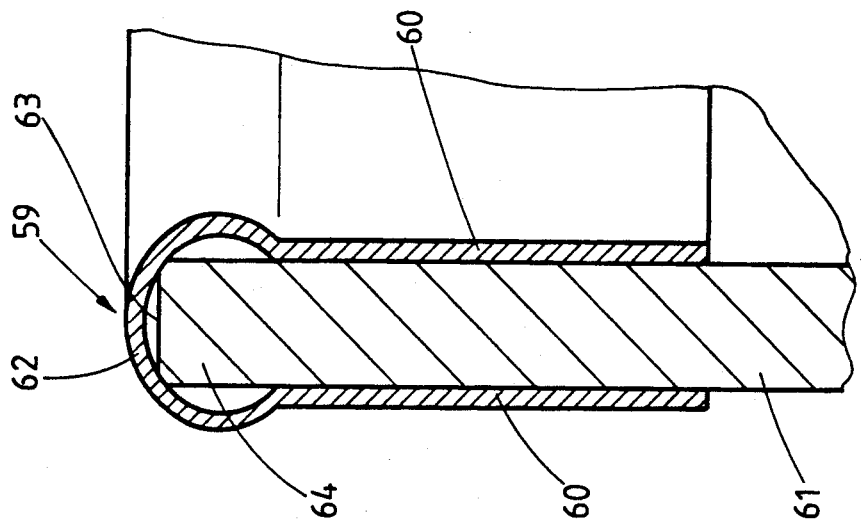
Figure 8:
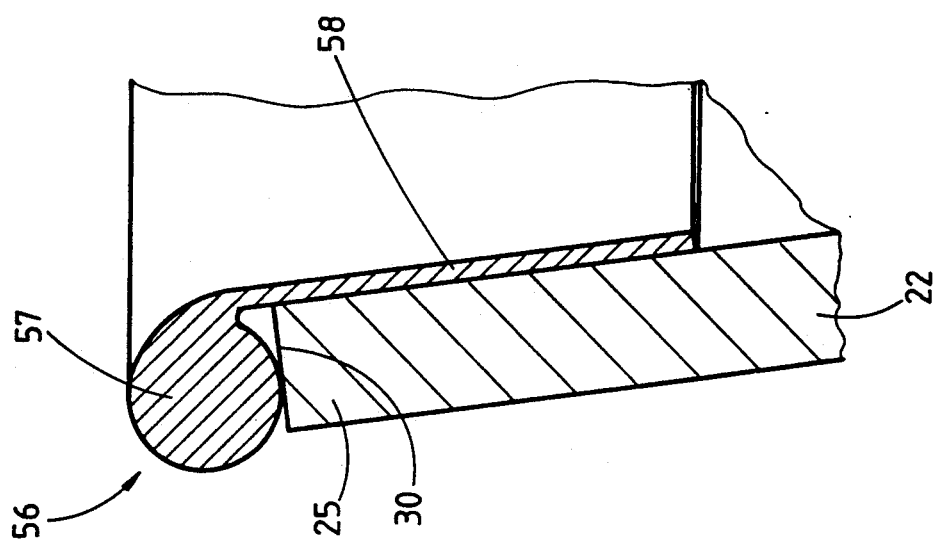
Figure 12:
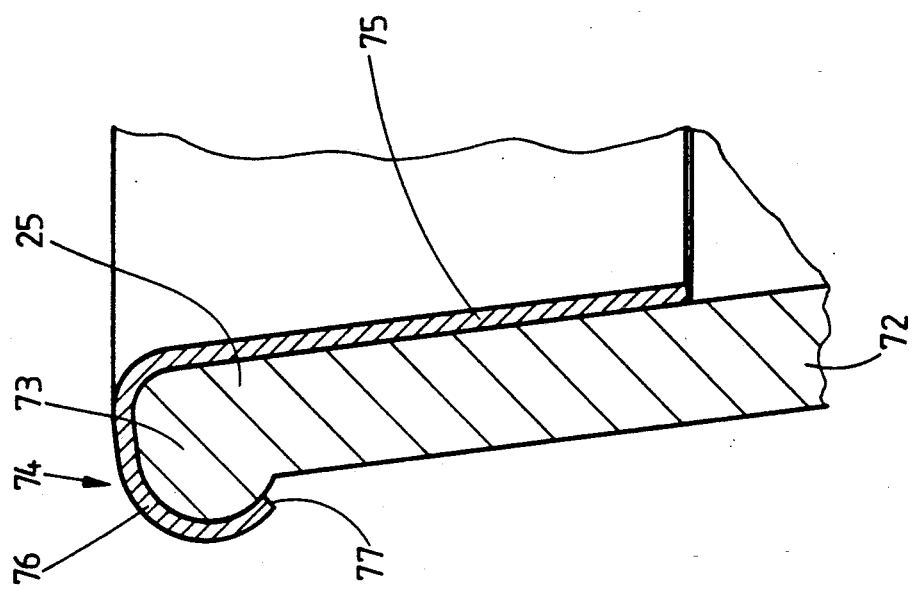
Figure 11:
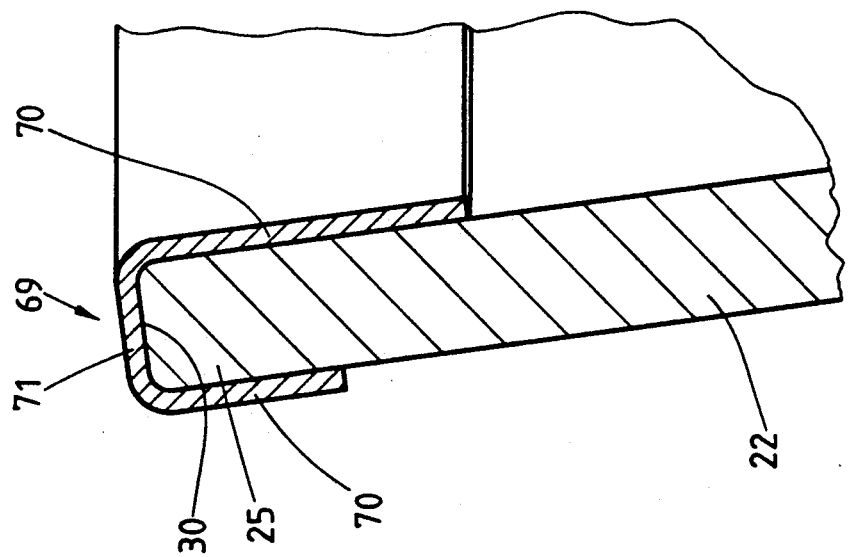

Preferred exemplary embodiments of containers, particularly drinking cups, according to the invention are explained in more detail below by means of the drawing. In this:

FIG. 1 shows a partial cross-section of a drinking cup,

FIG. 2 shows a greatly enlarged representation of the detail II of the drinking cup of FIG. 1 in the region of a collar, FIG. 3 shows a view, similar to that of FIG. 1, of a drinking cup closed by means of a collar having a lid, FIG. 4 shows an enlarged representation of the detail IV of the drinking cup according to FIG. 3 in the region of the collar, FIG. 5 shows an alternative embodiment of the collar in a representation according to FIG. 2, FIG. 6 shows an alternative embodiment of the collar in a representation similar to that of Figure 2, FIG. 7 shows an alternative collar in a representation according to that of FIG. 2, FIG. 8 shows an alternative collar in a representation similar to that of FIG. 2, FIG. 9 shows an alternative collar in a representation according to that of FIG. 2, FIG. 10 shows an alternative collar in a representation FIG. 11 shows an alternative collar in a representation similar to that of FIG. 2, and FIG. 12 shows a further alternative collar in a representation similar to that of FIG. 2.

The container illustrated is a drinking cup 20 which is intended primarily to be used once only. The drinking cup 20 is composed of a cup body 21 which, in the exemplary embodiments shown, is produced from plastic foam, and of a collar consisting of non-foamed material, especially a compact thermoplastic.

In the drinking cup 20 illustrated, the cup body 21 is of rotationally symmetrical design. It has a slightly conical shell 22, that is to say a wall circularly continuous with a slight inclination, and a bottom 23 closing the lower end region of the shell 22 of smaller diameter. The upper end of the shell 22 is unclosed. The cup body 21 thus has a circular orifice 24 which is surrounded by a continuous upper rim 25 of the shell 22.

In the exemplary embodiment of FIGS. 1 and 2, the drinking cup 20 possesses a collar 26 which is composed of a connecting part 27 and of an arc segment 28 formed in one piece on it. The connecting part 27 is designed to correspond to the inner dimensions of the cup body 21, particularly of the upper rim 25 of the shell 22. Here, therefore, the connecting part 27 also has an approximately frustoconical shape. The connecting part 27 terminates with a lower free end 29 in the cup body 21, so that the collar 26 leaves the orifice 24 of the cup body 21 open.

The arc segment 28 of the collar 26 adjoins an end of the connecting part 27 located opposite the free end 29. This arc segment 28 is approximately semicircular (as seen in cross-section) and is located outside the container body 21. The arc segment 28 thereby covers an end wall 30 of the cup body 21 extending approximately transversely relative to the surface of the shell 22. In the exemplary embodiment shown, the outside diameter of the connecting part 27 corresponds approximately to double the thickness of the shell 22. Thus, in particular, the arc segment 28 of the collar 26 forms a pronounced mouth roll which makes it possible to drink easily from the drinking cup 20.

FIGS. 3 and 4 show the drinking cup 20 with a collar 31 according to a further exemplary embodiment of the invention. The collar 31 is of a design similar to that of the collar 26 in terms of its connecting part 32 and its arc segment 33. In addition, the collar 31 of the exemplary embodiment shown possesses a lid 34 which at the same time closes the drinking cup 20. The lid 34 is formed in one piece onto a lower free edge 35 of the connecting part 32 and thus closes the orifice 24. A continuous notch 36 is arranged in the region of the transition between the connecting part 32 and the lid 34. In the exemplary embodiment illustrated, this notch 36 is approximately V-shaped and is made in the collar 26 to such a depth that, on the one hand, the orifice 24 of the drinking cup 20 is closed in a liquid-tight manner, but on the other hand the lid 34 can easily be separated from the connecting part 32 by hand in order to open the drinking cup 20. To make this separating operation easier, a pull-open tab or the like, not shown in FIG. 4, can be arranged on the lid.

FIG. 5 illustrates a further collar 37 which is designed in a similar way to the collar 26 of FIGS. 1 and 2, that is to say does not have a lid 34. This collar 37 too is composed of a connecting part 38 and of an arc segment 39. The connecting part 38 corresponds to the connecting part 27 of the collar 26. In the exemplary embodiment shown, only the arc segment 39 is modified in relation to this, in particular, on the one hand, is made approximately semicircular and, on the other hand, is equipped with an approximately U-shaped flanging 40 in the end region located outside the cup body 21. A free end 41 of the flanging 40 is guided from outside up against the shell 22 of the cup body 21, specifically approximately in such a way that the free end 41 terminates approximately in the plane of the end wall 30 of the cup body 21, whilst bearing on this. The collar 37 thus forms a virtually completely closed mouth roll, into which virtually neither liquids nor dirt can penetrate by virtue of the flanging 40.

In the exemplary embodiment of FIG. 6, the drinking cup 20 not only has a developed collar 42; on the contrary, the cup body 21 too is modified. The latter possesses a continuous recess 43 in the region of the upper rim 25 of the shell 22. Starting from the end wall 30 of the shell 22, the recess 43 is assigned to the inner surface of the latter. The width of the recess 43 corresponds approximately to the width of a connecting part 44 of the collar 42. In the exemplary embodiment illustrated, the depth of the recess 43 is somewhat larger than the length of the connecting part 44. A narrow gap 48 for tolerance compensation is thus obtained between the lower free edge 46 of the connecting part 44, on the one hand, and the end 47 of the recess 43 in the shell 22, on the other hand.

The collar 42 possesses a bead portion 49 formed in one piece on the upper edge of the connecting part 44. The bead portion 49 is designed as an approximately cylindrical hollow body, in which a free end 50 of the bead portion 49 is rolled so far inwards that it overlaps from inside a region of the bead portion 49 adjoining the connecting part 44. In the exemplary embodiment shown, the diameter of the bead portion 49 is somewhat larger than the wall thickness of the shell 22, with the result that the bead portion 49 is approximately in the extension of the cup body 21 in the region of the upper end wall 30 of the shell 22, specifically bearing on it in the exemplary embodiment illustrated. The bead portion 49 thus limits the depth of penetration of the connecting part 44 into the cup body 21, thereby forming the gap 48.

FIG. 7 shows a collar 51 which, in cross-section, corresponds essentially to the collar 42 of FIG. 6. A bead portion 52 of this collar 51 is of closed tubular design. A connection part 53 is formed on one side of this in a transition-free manner.

FIG. 7 shows, furthermore, an alternative assignment of the collar 51 to the cup body 21, in that, in particular, a free edge 54 of the connecting part 53 bears against the end 47 of the recess 43, present here too, in the cup body 21, in order to limit the depth of penetration of the collar 51 into the cup body 21. A small gap 55 is consequently located between the end wall 30 of the cup body 21 and the underside of the bead portion 52.

FIG. 8 shows a collar 56 which again corresponds in cross-section to the collar 51 or 42, but which has a solid bead portion 57 without an inner cavity. An especially stable collar 56 is obtained thereby. In the exemplary embodiment illustrated, as in the exemplary embodiments of FIGS. 1 to 4, the connecting part 58 of the collar 56 bears against the inside of the cup body 21, since the shell 22 has no recess 43 here. However, the collar 56 together with the connecting part 58 can also be arranged according to FIG. 6 or 7 in a corresponding recess 43 in the shell 22.

FIG. 9 shows a collar 59 of essentially U-shaped design. The latter possesses two parallel connecting parts 60 which are arranged on the one hand on the outside and on the other hand on the inside of the shell 61 of the drinking cup 20, for this purpose the shell 61 being made cylindrical in the exemplary embodiment illustrated. It is also possible to arrange the collar 59 only on a cylindrical upper rim region of the otherwise frustoconical shell 61.

The connecting parts 60 are connected in one piece to a bead portion 62. In the exemplary embodiment shown, this has an arcuate shape somewhat more than semicircular, a connecting part 60 being formed in one piece onto each end of the bead portion 62. In the exemplary embodiment shown, the bead portion 62 rests with its inside on the end wall 63 of the shell 61. This at the same time limits the depth to which the collar 59 can be attached onto the upper rim 64 of the shell 61.

FIG. 10 shows a further exemplary embodiment of a collar 65, in which both a bead portion 66 and a connecting part 67 are designed as hollow bodies. The cavities of the bead portion 66 and of the connecting part 67 merge into one another. The collar 65 is of mirror-symmetrical design, in that the connecting part 67 is formed on approximately centrally under the once again approximately circular bead portion 66. The collar 65 thus has a keyhole-like cross-sectional shape.

In the exemplary embodiment illustrated, the cup body 21 once again possesses a recess 43 in the region of the upper rim 25 of the shell 22. This recess 43 is of a width somewhat larger than half the thickness of the shell 22, so that a center line 68 of the collar 65 lies approximately in the middle of the shell 22.

FIG. 11 shows a collar 69 which has three straight portions, namely two parallel connecting parts 70 and a web portion 71 joining these. Each connecting part 70 extends at an angle of approximately 90° relative to the web portion 71. Thus, the connecting parts 70 bear on the outside or inside of the shell 22, whilst the web portion 71 bears on the upper rim 25 of the cup body 21. In the exemplary embodiment shown, the connecting parts 70 are of differing length, in that the inner connecting part 70 is longer. The collar 69 can thereby more easily be attached positively onto the frustoconical shell 22. It is also possible, however, to make the connecting parts 70 of equal length or to make the outer connecting part 70 longer than the inner connecting part 70. This alternative shape of the collar 69 is especially suitable for cylindrical cup bodies, for example according to FIG. 9.

Finally, FIG. 12 shows an exemplary embodiment in which a shell 72 possesses, at its upper rim, a bead-shaped thickening 73 which projects relative to the outside of the shell 72.

A collar 74 shown in FIG. 12 is composed of a connecting part 75 once again bearing on the inside of the shell 72 and of an arc segment 76. The latter is for the most part guided arcuately round the thickening 73. A free end 77 of the arc segment 76 terminates here below the widest point of the thickening 73. Moreover, the free end 77 forms an undercut, with the result that the collar 74 is held positively against the shell 72 on the thickening 73.

Whilst it can be sufficient, in the exemplary embodiment of FIG. 12, to connect the collar 74 to the cup body 21 positively, the collars 26, 31, 37, 42, 51, 56, 59 and 65 are preferably fastened to the respective cup body 21 frictionally and alternatively or additionally by adhesive bonding, welding, sealing or the like. It is also possible to equip the side of the connecting part 27, 32, 38, 44, 53, 58, 60, 67, 70, 75 directed towards the cup body 21 with one or more punctiform or linear projections which are imprinted into the shell 22 of the cup body 21, preferably in a sawtooth-like manner, during attachment onto the latter and which, by positive engagement, effectively prevent the collar 26, 31, 37, 42, 51, 56, 59, 65 or 69 from being pulled out of the cup body 21.

Preferred processes for producing the drinking cup 20 are explained in more detail below with reference especially to FIGS. 1 and 2:

The drinking cups 20 are obtained essentially in three steps, namely the production of the cup body 21, production of the collar 26 and connection of the cup body 21 to the collar 26. The two first-mentioned production steps can take place independently of one another and, if appropriate, also simultaneously.

The cup body 21 is produced in a way known per se. According to this, as is evident, above all, from FIGS. 1 to 4, the cup body 21 can be foamed in one piece in an appropriate mould. It is also possible, however, to produce the cup body 21 differently from the representation in FIGS. 1 to 4 by coiling the shell 22 and inserting or welding the bottom 23 into it in a liquid-tight manner.

The collar 26 is extruded as a continuous straight strand. Before further processing, this can be rolled up to form a roll, the diameter of which is preferably considerably larger than that of the drinking cup 20. Appropriately, extrusion takes place in such a way that the strand leaving the extruder is automatically wound to the appropriate diameter.

To connect the collar 26, a portion of appropriate length is separated from the endlessly extruded strand. Thereafter, or alternatively also before the separation, a reheating of the strand portion is carried out, with the result that the collar profile can be brought to the circular form of the upper rim 25 on the cup body 21. The circularly prebent collar 26 is subsequently attached onto the upper rim 25 of the cup body 21 and, if appropriate, additionally connected to this, for example by welding or adhesive bonding. Alternatively, it is also possible, for the purpose of forming the collar 26, to lay the prefabricated strand portion with one end onto the upper rim 25 of the cup body 21 and then guide it further round the rim 25, the circular shape of the collar 26 necessarily being obtained.

The ends of the strand portion for forming the collar 26 which point towards one another can either come in front of one another as a butt seam or overlap slightly. The last-mentioned alternative is recommended especially where relatively large dimensional deviations of the cup body 21 are to be expected. Moreover, the strand portions do not have to be cut exactly to length.

Alternatively, it is possible to produce the collar 26 in its round shape with an appropriate diameter by injection moulding or deep drawing. A collar 26 produced in this way need merely be attached onto the upper rim 25 of the cup body 21 and, if appropriate, adhesively bonded or welded to this. Reheating is not necessary. A collar 26 so formed is also characterised in that it does not have any butt or lap seam.

Collars 31 shown in FIGS. 3 and 4 and having a lid 34 must necessarily be produced by deep drawing or injection moulding. It is also possible to remove the lid 34 from the collar 31 before connection to the cup body 21, specifically either by cutting, punching or the like. This provides a drinking cup 20 with a collar 26 of FIGS. 1 and 2. This procedure makes the handling of the collar 26 easier during the feed to the cup body 21, because the lid 34 still present before the connection prevents a plurality of collars 26 from catching in one another. It is thereby possible, furthermore, as an alternative to produce both closed and open drinking cups 20.

Alternatively, a blank for forming the collar 26 can be punched out from a sheet-like web of material. This is carried out in such a way that an arcuate annular segment is obtained. The radius of curvature of this arcuate blank is selected so that it is possible to form from this a frustoconical annulus, the lower edge region of which is shaped to correspond to the inner dimensions of the upper rim 25 of the cup body 21, that is to say has been inserted from above into the upper rim 25 of the cup body 21.

After the arcuate blank strip has been introduced into a ring mould, its ends pointing towards one another are connected together. This can be carried out by means of a butt or lap seam, specifically either by welding or adhesive bonding. The frustoconical ring thus obtained constitutes a rough for the collar 26, the upper edge of which is reshaped by means of a rotary tool, preferably with heating, in order to form a continuous mouth roll, namely the arc segment 28 on the collar 26. This mouth roll can also be shaped in such a way that a collar 31, 37 or 42 according to the embodiments of FIGS. 4 to 6 is obtained.

In a further alternative process for producing the drinking cup 20, a plane arcuate blank for the shell 22 of the cup body 21 is equipped at the upper rim 25 with a likewise plane blank resembling a circle segment for the collar 26. The two blanks cut out from separate webs of different plastic materials (foamed plastic for the shell 22; compact plastic for the collar 26) are first connected to one another, in that a lower edge of the blank for the collar 26 is adhesively bonded or otherwise fastened to one side (the subsequent inside) of the upper rim 25 of the shell 22. Thereafter, the blanks thus connected to one another are so shaped (jointly) that they have a frustoconical shape in order to form the cup body 21 and a rough for the collar 26. The ends of the blanks pointing towards one another are connected here by means of a lap or butt seam. This can be carried out by adhesive bonding or welding.

The bottom 23 is now inserted or welded into the cup body 21 in a liquid-tight manner. The collar 26 is then completed, in particular the arc segment 28 shaped to form the mouth roll. This is carried out preferably by means of a revolving rotary tool which can be heated. The collars 31, 37, 42, 69, 74 of the exemplary embodiments according to FIGS. 4 to 6 and 11 and 12 can also be produced by this process.

In principle, drinking cups or other containers of a different shape, for example with a quadrangular or square base, can also be produced by the processes described above. At the same time, cup bodies made of waxed or non-waxed cardboard or similar materials can also be used.

I claim:
1. A drinking cup comprising:
 a container body having an upper continuous rim for forming an orifice;
 a mouth roll including a separate continuous collar, said collar comprising a connecting part and an arc segment formed in one piece onto the connecting part, said connecting part being disposed along an inner wall of the upper continous rim to connect the mouth roll to the container body; and a lid which covers at least a portion of the orifice, said lid being arranged on a lower free edge of the connecting part of the collar and having a continuous predetermined breaking seam at said lower free edge.

2. A drinking cup comprising:

a container body having an upper continous rim forming an orifice; and a mouth roll including a separate continuous collar, said collar comprising a connecting part and an arc segment formed in one piece onto the connecting part, said connecting part being disposed along an inner wall of the upper continuous rim to connect the mouth roll to the container body, and wherein an entire surface of said connecting part is matched against said inner wall and is attached to said inner wall by a seal.

3. A drinking cup comprising:

a container body having an upper continuous rim forming an orifice; and a mouth roll including a separate continuous collar, said collar comprising a connecting part and an arc segment formed in one piece onto the connecting part, said connecting part being disposed along an inner wall on the upper continuous rim to connect the mouth roll to the container body, and wherein an entire surface of said connecting part is matched against said inner wall and is attached thereto by adhesive bonding.

4. The drinking cup as claimed in claims 2 or 3 wherein the container body and the connecting part are identically conical.

5. The drinking cup as claimed in claims 2 or 3 wherein said inner wall conically widens toward the orifice.

6. The drinking cup as claimed in claims 2 or 3 wherein the arc segment of the mouth roll surrounds a portion of the upper continuous rim of the container body.

7. The drinking cup as claimed in claims 2 or 3 wherein said container body comprises a material selected from the group comprising plastic foam and cardboard and wherein said continuous collar comprises a compact material.

8. The drinking cup as claimed in claims 2 or 3 wherein said mouth roll is comprised of a compact thermoplastic.

* * * * *